(12) United States Patent
Alper et al.

(10) Patent No.: US 8,619,729 B2
(45) Date of Patent: Dec. 31, 2013

(54) METHOD FOR DISCOVERING NEIGHBOR NETWORKS IN MOBILE STATION AND NETWORK SYSTEM FOR ENABLING THE METHOD

(75) Inventors: Yegin Alper, Istanbul (TR); Youn-Hee Han, Yongin-si (KR); JinHyeock Choi, Suwon-si (KR); Hee-Jin Jang, Yongin-si (KR); Xiaoyu Liu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 11/921,665

(22) PCT Filed: Jun. 5, 2006

(86) PCT No.: PCT/KR2006/002158
§ 371 (c)(1),
(2), (4) Date: Jan. 29, 2009

(87) PCT Pub. No.: WO2006/132487
PCT Pub. Date: Dec. 14, 2006

(65) Prior Publication Data
US 2009/0135758 A1    May 28, 2009

Related U.S. Application Data

(60) Provisional application No. 60/776,221, filed on Feb. 24, 2006, provisional application No. 60/687,833, filed on Jun. 6, 2005.

(30) Foreign Application Priority Data

Jun. 1, 2006 (KR) .................. 10-2006-0049467

(51) Int. Cl.
*H04W 4/00* (2009.01)
*H04W 36/00* (2009.01)
*H04M 1/00* (2006.01)
*H04B 7/00* (2006.01)
*G06F 15/16* (2006.01)
*G06F 15/173* (2006.01)
*H04L 12/28* (2006.01)
*H04L 12/66* (2006.01)

(52) U.S. Cl.
USPC ............... 370/338; 455/432.1; 455/435.2; 455/436; 455/525; 455/552.1; 370/254; 370/331; 370/353; 370/401; 709/227; 709/228; 709/230; 709/238

(58) Field of Classification Search
USPC ......... 370/310, 345, 254, 351, 328, 331–334, 370/338, 353, 401; 455/434, 435.2, 455/436–444, 432.1, 525, 456.3, 455/552.1–553.1; 709/217–219, 227–228, 709/230, 238
See application file for complete search history.

(56) References Cited

U.S. PATENT DOCUMENTS

| 6,094,424 | A * | 7/2000 | Kalmanek et al. ............ 370/328 |
|---|---|---|---|
| 7,461,248 | B2 * | 12/2008 | Zhang et al. .................. 713/155 |
| 2002/0018476 | A1 | 2/2002 | Roy |
| 2002/0059453 | A1 * | 5/2002 | Eriksson et al. ............. 709/238 |
| 2003/0227911 | A1 * | 12/2003 | Trossen ......................... 370/352 |
| 2004/0081122 | A1 | 4/2004 | Koodli et al. |
| 2004/0100922 | A1 * | 5/2004 | Yegin ............................ 370/328 |
| 2004/0166857 | A1 * | 8/2004 | Shim et al. .................... 455/436 |
| 2005/0073992 | A1 | 4/2005 | Lee et al. |
| 2005/0097087 | A1 * | 5/2005 | Punaganti Venkata et al. ... 707/3 |
| 2005/0125550 | A1 * | 6/2005 | Bajikar ......................... 709/230 |
| 2005/0272481 | A1 * | 12/2005 | Kim ............................... 455/574 |
| 2006/0092890 | A1 * | 5/2006 | Gupta et al. ................... 370/338 |
| 2006/0140150 | A1 * | 6/2006 | Olvera-Hernandez et al. ............................ 370/331 |
| 2006/0224769 | A1 * | 10/2006 | Moonen ........................ 709/238 |
| 2006/0252408 | A1 * | 11/2006 | Faccin et al. ................. 455/404.2 |

FOREIGN PATENT DOCUMENTS

| EP | 1 126 738 A2 | 8/2001 |
|---|---|---|
| EP | 1 443 712 A1 | 8/2004 |
| JP | 2001-211180 | 8/2001 |
| KR | 10-2005-0040180 A | 5/2005 |
| KR | 10-2005-0041820 A | 5/2005 |

| | | | |
|---|---|---|---|
| KR | 10-2005-0109692 A | 11/2005 | |
| WO | WO 01/08152 A1 | 7/2000 | |
| WO | WO 01/31472 A1 | 5/2001 | |
| WO | WO 03/058917 A1 | 7/2003 | |
| WO | WO 03/085892 A2 | 10/2003 | |
| WO | WO 03/092315 A1 | 11/2003 | |

OTHER PUBLICATIONS

European Search Report issued on Sep. 11, 2009, in corresponding European Application No. 06768764.0 (6 pages). Ashutosh Dutta et al., "Seamless Handover across Heterogeneous Networks—An IEEE 802.21 Centric Approach", date unknown.

* cited by examiner

*Primary Examiner* — Anthony Addy
*Assistant Examiner* — Michael Mapa
(74) *Attorney, Agent, or Firm* — NSIP Law (57) ABSTRACT

The present invention relates to a wireless network, and more particularly, a method (*"and system"?*) which a mobile station discovers a neighbor network in an Internet protocol based wireless network, a network management server for enabling the method, and a method of operating the network management server. A network management server of a wireless network system, the server including: a neighborhood (NH) database maintaining configuration information with respect to at least one neighbor network; a communication interface receiving a request message for capability/configuration information of the neighbor network from a mobile station which is connected via a predetermined access point or a base station; and a database management unit extracting the capability/configuration information of the neighbor network which is included in the request message by referring to the neighborhood database, and controlling a reply message including the capability/configuration information to be transmitted to the mobile station via the communication interface.

28 Claims, 5 Drawing Sheets

METHOD FOR DISCOVERING NEIGHBOR NETWORKS IN MOBILE STATION AND NETWORK SYSTEM FOR ENABLING THE METHOD

This application is a national stage application under 35 USC 371 of International Application No. PCT/KR2006/002158, filed on Jun. 5, 2006, which claims the benefit of Korean Application No. 10-2006-0049467, filed on Jun. 1, 2006, in the Korean Intellectual Property Office, claims the benefit of U.S. Provisional Application No. 60/776,221, filed on Feb. 24, 2006, claims the benefit of U.S. application Ser. No. 11/342,326, filed on Jan. 27, 2006, and claims the benefit of U.S. Provisional Application No. 60/687,833, filed an Jun. 6, 2005, the entire disclosures of which are incorporated herein by reference for all purposes.

TECHNICAL FIELD

The present invention relates to a wireless network, and more particularly, a method that a mobile station discovers a neighbor network in an Internet protocol based wireless network, a network management server for enabling the method, and a method of operating the network management server.

BACKGROUND ART

As demand for a mobile communication has been increasing, development of many wireless networks has been performed. Also, in order to provide a seamless service of such heterogeneous wireless networks, various discussions and technology developments of a next generation network (NGN) have been proceeding.

The wireless network includes a local area network (LAN), a wide area network (WAN), a metropolitan area network (MAN), a wireless LAN network, a wireless personal area network (WPAN), a general packet radio service (GPRS) system, a wireless fidelity (WiFi) system, a worldwide interoperability for microwave access (WiMAX) system, and a code division multiple access (CDMA) 2000 system. WiFi indicates a particular type of a WLAN which uses IEEE 802.11-related specifications. WiMAX indicates a type of a broadband wireless access based on the IEEE 802.16 standard for MAN. Such wireless network systems enable communications among various mobile stations such as a personal computer, a mobile phone, or a portable communication terminal. Above-described wireless network system further includes at least one bridge element such as an access point or an access node where entry/exit of user traffic is performed.

In the case that the above-described various wireless network technologies are developed and embodied, an issue of compatibility among at least two different wireless networks is raised. Namely, technology providing an individual mobile station with Internet protocol (IP) address for compatibility among different wireless systems, which is entitled as All-IP technology, is limited. Also, various related technology issues such as development of the Internet protocol version 6 (IPv6) for enlarging an address resource under the All-IP technology, a neighbor network discovery technology under the IPv6, and an improved technology of a mobility service including a handover under the IPv6 are proposed. Particularly, the neighbor network discovery method of the mobile station (MS) which is located in at least two different wireless networks in the All-IP environment is problematic. As an example, a neighbor network discovery technology may be required to determine which wireless networks in the heterogeneous wireless network environment including a WiFi network, a WiMAX network, and a CDMA 2000 network that the MS will access to and perform a handover with.

As described above, studies to discover a capability and configuration information with respect to the neighbor network have been advancing. The study includes a solution of using a media access control (MAC) layer design. However, the design may provide only a portion of information which is necessary for simplifying the entire discovery. Also, as an example, an IEEE 802.11k solution for the WLAN may not be generally applied to the different wireless network systems except for an IEEE 802.11 link. Also, the solution through the MAC layer design may not be easily applied to a legacy network. Similarly, a portion of information about the neighbor network may be obtained by operations of a few particular protocols. For example, a portion of information about the neighbor network may be obtained by using a protocol like a proxy router discovery. In this instance, the proxy router is used in a mobile IPv6 fast handover. However, the method using the proxy router also has a restricted applicability. Also, the method using the proxy router may not satisfy needs such as applicability to the All-IP environment, a discovery of all neighbor networks around the MS, and an extensive learning about capability/configuration information of the neighbor network in the MS.

Currently, the IEEE 802.21 Working Group has made various proposals for inter-operability among different wireless networks, such as supporting of a fast handover in the All-IP environment. However, the IEEE 802.21 Working Group may not have proposed a technical solution to the questions: in which way does the MS request the neighbor network discovery; which entity responds to a request for the neighbor network discovery; and, in which message format is a corresponding request and reply transceived.

Accordingly, a method for discovering neighbor networks in the MS and a system for enabling the method which are available in a next generation network system that the All-IP technology will be commonly included in, is provided.

DISCLOSURE OF INVENTION

Technical Goals

The present invention provides a method for discovering neighbor networks in a mobile station (MS) and a network system for enabling the method, which optimizes a handover of the MS in at least two different wireless network environments.

The present invention also provides a method for discovering neighbor networks in the MS, which is easily applicable to a legacy network by using a general dynamic host configuration protocol (DHCP).

The present invention also provides a method for discovering neighbor networks in the MS and a network system for enabling the method, which provides the MS with information elements with respect to the neighbor networks by using a media independent handover (MIH) information service (IS) which is proposed by the IEEE 802.21 Working Group.

The present invention also provides a specific solution and a transmission message format for a handover among different wireless networks under discussion in the IEEE 802.21 Working Group.

Technical Solutions

According to an aspect of the present invention, there is provided a network management server of a wireless network system, the server including: a neighborhood (NH) database maintaining configuration information with respect to at least one neighbor network; a communication interface receiving a request message for capability/configuration information of the neighbor network from a mobile station which is connected via a predetermined access point or a base station; and a database management unit extracting the capability/configuration information of the neighbor network which is included in the request message by referring to the NH database, and controlling a reply message including the capability/configuration information to be transmitted to the mobile station via the communication interface.

According to another aspect of the present invention, there is provided a method of discovering a neighbor network, the method including: receiving beacon information from the neighbor network, and identifying the neighbor network by using the beacon information; transmitting a request message for capability/configuration information of the neighbor network to a predetermined network management server via an access point or a base station; and receiving a reply message including the capability/configuration information with respect to the neighbor network from the network management server.

BEST MODE FOR CARRYING OUT THE INVENTION

A mobile station (MS) as used in the present specification includes mobile communication devices, such as a Personal Digital Cellular (PDC) phone, a personal communication service (PCS) phone, a personal handyphone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a Digital Multimedia Broadcasting (DMB) phone, a smart phone, an orthogonal frequency division multiplexing (OFDM) phone, and an orthogonal frequency division multiple access (OFDMA) phone; portable terminals such as a personal digital assistant (PDA), a hand-held PC, a notebook PC, a laptop computer, a wireless broadband Internet (WiBro) terminal, an MP3 player, and a mini disc (MD) player; and all types of hand-held based wireless communication devices including an International Mobile Telecommunication (IMT)-2000 providing international roaming service and extended mobile communication service. Also, the portable device may include a predetermined communication module such as an orthogonal frequency division multiplexing access (OFDMA) module, a CDMA module, a Bluetooth module, an Infrared Data Association (IrDA) module, a wired/wireless LAN card and a wireless communication device which is provided with a global positioning system (GPS) chip enabling tracking of a position via a GPS. Also, the portable device may include a microprocessor which can play multimedia and perform a certain calculation operation.

Also, a neighbor network indicates a wireless network which is located around the wireless network where the MS currently is located.

Figure 1:
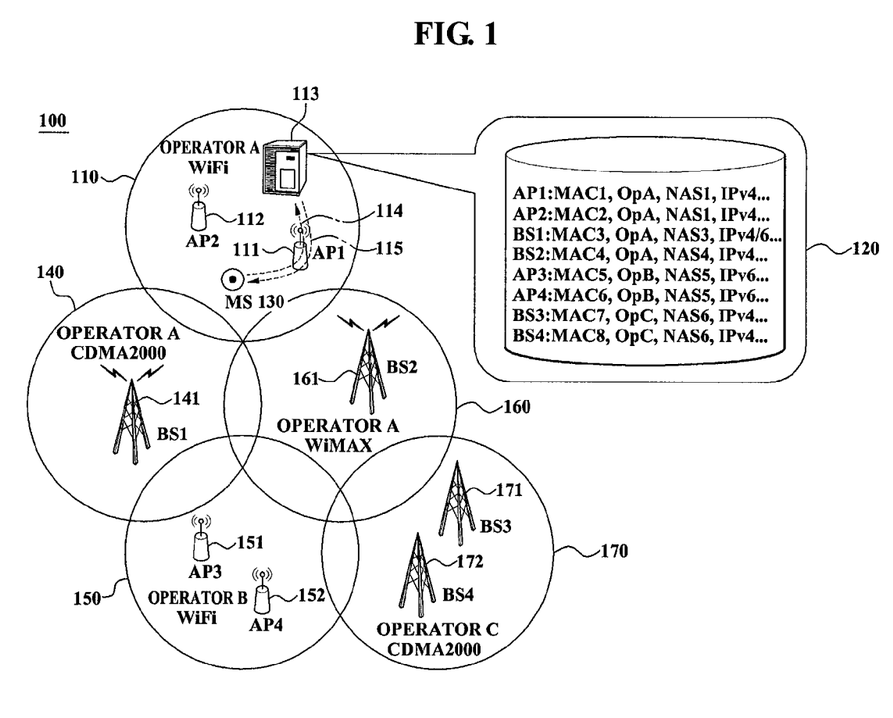
FIG. 1 is a block diagram illustrating an outline of a network including a network management server and a mobile station (MS) in a wireless network system including at least two different networks according to the present invention.

FIG. 1 is a block diagram illustrating an outline of a network including a network management server and a mobile station (MS) in a wireless network system including at least two different networks according to the present invention.

A block diagram illustrated in FIG. 1 illustrates an embodiment of a wireless network system. The wireless network system proactively discovers capability/configuration information of a candidate neighbor network among neighbors of the MS according to the present invention. The wireless network system includes at least two different networks. In this instance, the wireless network system may include at least one of an IEEE 802.11a/11b/11g network, i.e. a WiFi network, a wireless local area network (WLAN), a metropolitan area network (MAN) such as a worldwide interoperability for microwave access (WiMAX), a wireless personal area network (WPAN), a general packet radio services (GPRS) network, a Global System for Mobile communication (GSM) network, a code division multiple access (CDMA) network such as CDMA 2000, a Bluetooth network, and other wireless networks. FIG. 1 illustrates an example of a wireless network system including two WiFi networks, a WiMAX network, and two CDMA 2000 networks from among the above wireless network systems.

As illustrated in FIG. 1, a wireless network system 100 includes a plurality of mobile networks which are operated by a plurality of network operators. Such mobile networks include a WiFi network 110, a CDMA 2000 network 140, and a WiMAX network 160 which are operated by an operator A. Also, such mobile networks include a WiFi network 150 which is operated by an operator B, and a CDMA 2000 network 170 which is operated by an operator C. Such mobile networks 110, 140, 150, 160, and 170 respectively include at least one access point (AP) or a base station (BS) to provide a MS 130 with a predetermined mobile service, and a network management server, for example, a dynamic host configuration protocol (DHCP) server, providing host configuration information with respect to the MS 130 which is located in a corresponding mobile network. A network management server 113 may be connected via an access point (AP), an access router (AR), or a dedicated server for an access network. Also, the WiFi network 110 illustrated in FIG. 1 includes a first access point AP1 111, a second access point AP2 112, and the network management server 113. The network management server 113 is connected with a neighborhood (NH) database 120. In this instance, a location of the NH database 120 may be in the same physical location as the network management server 113. Also, the NH database 120 may be a separate entity which is located in a remote location, connected via a predetermined wire/wireless network.

Also, the CDMA 2000 network 140 illustrated in FIG. 1 includes a first base station BS1 141. The WiFi network 150 includes a third access point AP3 151 and a fourth access point AP4 152. The WiMAX network 160 includes a second base station BS2 161. The CDMA network 170 includes a third base station BS3 171 and a fourth base station BS4 172. Each of the networks 140 through 170 further includes a respective network management server.

The MS 130 communicates with the network management server 113 via the first access point AP1 111 as shown in routes 114 and 115. A description of the routes 114 and 115 will be described later. The NH database 120 of the network management server 113 includes a plurality of information fields with respect to a respective access point or a respective base station. In this instance, the access point or the base station is the access point or the base station of the WiFi network 150 and at least one neighbor network 140 through 170 which are located around the WiFi network. Examples of the information fields include a media access control (MAC) address, an operator identifier, a network access server (NAS) identifier, Internet protocol identifier information such as an IPv4/6, and etc. Also, an information element (IE) as the capability/configuration information includes a network type, a radio type, a roaming partner list, compatibility information of IPv4/IPv6, security, quality of service (QoS) level information of each network, current load information for each neighbor network, a geographical location, a pre-authentication function, a pricing plan, a location based service (LBS) list, information on supporting virtual private network (VPN), a physical layer type, and a channel parameter. In this instance, the capability/configuration information may be recorded in the NH database 120. Such information elements may be manually inputted by a network operator. Also, variable information elements which can be updated in real time may be automatically inputted by a separate network management system.

Access points 111, 112, 151, and 152, and base stations 141, 161, 171, and 172 in the wireless network generally transmit and receive data to connect users in the respective wireless network. Also, the access points 111, 112, 151, and 152, and the base stations 141, 161, 171, and 172 in the wireless network function as a mutual connection point between the wireless network and a wired network. Namely, the MS 130 which may be called as a user terminal or an end terminal may access to a corresponding wireless network via the access points 111, 112, 151, and 152 and the base stations 141, 161, 171, and 172. Also, the MS 130 may be provided with a predetermined service which is provided from the corresponding wireless network.

The network management server 113 illustrated in FIG. 1 may be a DHCP server. The DHCP server allocates an IP address to a particular DHCP client through operations of 1) Discover, 2) Offer, 3) Request, and 4) ACK. The DHCP server maintains a database. In this instance, the database records information such as an allocatable IP address, a lease duration of an allocated IP address, a domain name system (DNS), a default gateway, a Windows Internet naming service (WINS), and the like. The network management server 113 according to the present invention is embodied using the DHCP server. Also, the network management server 113 according to the present invention records the information described above with respect to the neighbor networks in the NH database 120, and provides the MS 130 with the information. Unique IP addresses are) allocated to all IP terminals including the MS 130 according to the DHCP which is a general protocol. Accordingly, in operations 3) Request and 4) ACK according to the DHCP, neighbor networks around the MS 130 may be discovered by requesting the capability/configuration information of the neighbor network and receiving a reply with respect to the request.

Also, the network management server 113 includes a communication interface and a database management unit, which are not shown. In this instance, the communication interface receives a request message for the capability/configuration information of the neighbor network from the MS which is connected via a predetermined access point or the base station. Also, the database management unit extracts the capability/configuration information of the neighbor network which is included in the request message by referring to the NH database, and controls a reply message including the capability/configuration information to be transmitted to the MS via the communication interface.

Figure 2:
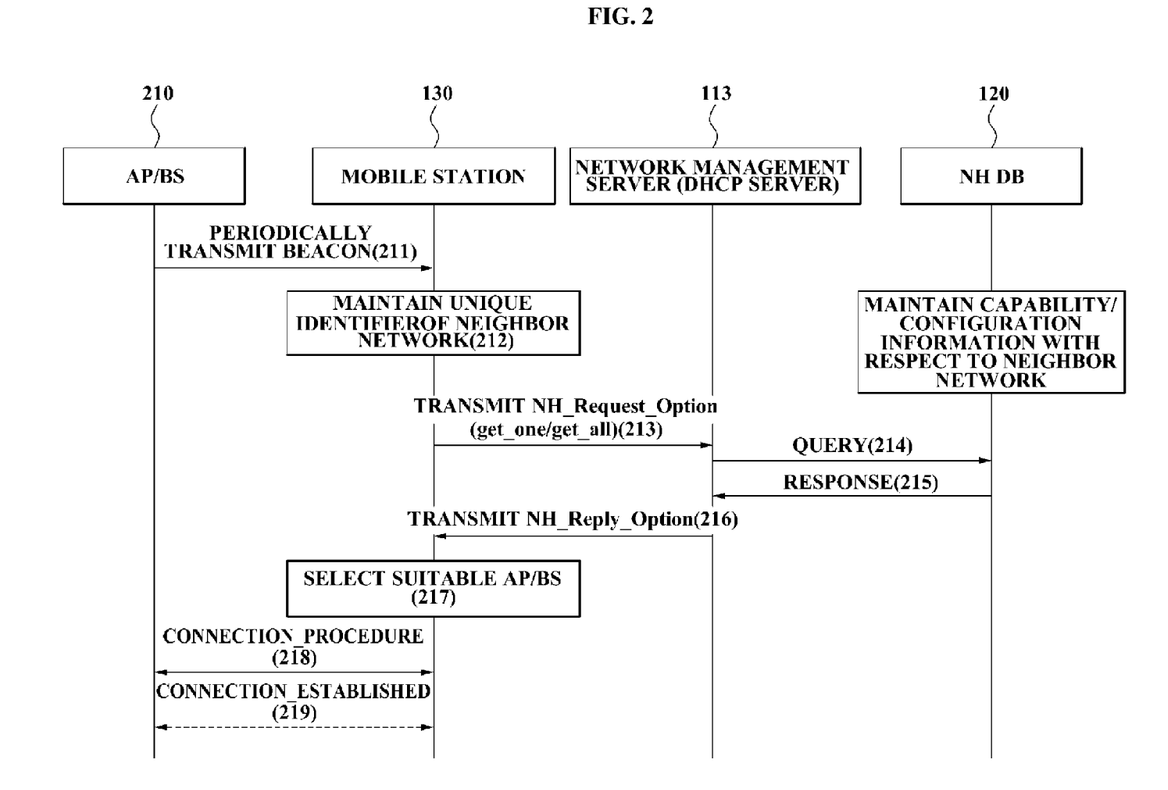
FIG. 2 is a flowchart illustrating an example of a method of discovering neighbor networks according to an embodiment of the present invention.

FIG. 2 is a flowchart illustrating an example of a method of discovering neighbor networks according to an embodiment of the present invention.

Referring to the FIG. 2, the method of discovering neighbor networks according to an embodiment of the present invention is performed among an access point/base station (AP/BS) 210, an MS 130, a network management server 113, and an NH database 120.

Figure 3:
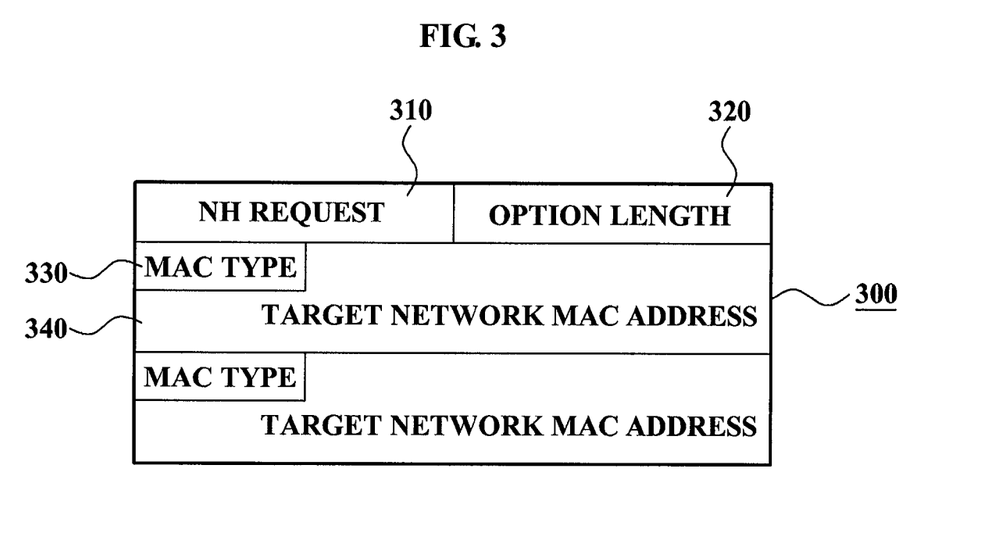
FIG. 3 is a diagram illustrating an example of a request message for capability/configuration information to request the capability/configuration information of the neighbor network from a mobile station to a network management server according to an embodiment of the present invention.

In operation 211, the AP/BS 210 periodically transmits a beacon to the MS 130. In this instance, the MS 130 is located in the neighbor network of a corresponding wireless network. In operation 212, a unique identifier of a corresponding AP/BS 210 such as a MAC address information is included in the beacon. Also, the MS 130, which received the beacon, records and maintains the unique identifier of the AP/BS 210 of the neighbor network in a predetermined recording medium. In operation 213, the MS 130 transmits a request message for capability/configuration information with respect to the neighbor network (i.e. NH_Request_Option) to the network management server 113 via the access point or the base station of the wireless network where the MS 130 is currently located. FIG. 3 illustrates an example of the request message for capability/configuration information which the MS 130 transmits to the network management server 113 in operation 213.

FIG. 3 is a diagram illustrating an example of a request message for capability/configuration information to request the capability/configuration information of the neighbor network from a MS to a network management server according to an embodiment of the present invention.

The request message for capability/configuration information 300 illustrated in FIG. 3 includes a neighborhood (NH) Request 310 and an option length 320. The NH Request 310 indicates a type of a DHCP request. The option length 320 indicates a size of an option such as a byte. The NH Request 310 and the option length 320 may follow a standard DHCP option format which is stated in a DHCP reference. A MAC type 330 and a target network MAC address 340 field may be selectively added. In this instance, the MAC type 330 includes information about a size and a format of the subsequent target network MAC address 340. Also, the target network MAC address 340 may be a MAC address of the access point or the base station of a particular wireless network. In this instance, the particular wireless network indicates the wireless network which the MS 130 requests from the network management server 113. The MAC address is information which is obtained by receiving the beacon from the MS. In this instance, the beacon is periodically transmitted to the access point of the neighbor network or the base station.

When the MAC type 330 and the target network MAC address 340 illustrated in FIG. 3 are not included in the request message for capability/configuration information 300, it indicates that the MS 130 requests capability/configuration information with respect to all neighbor networks to the network management server 113 (i.e. get_all). Also, when the MAC type 330 and the target network MAC address 340 illustrated in FIG. 3 are included, it indicates that the MS 130 requests capability/configuration information with respect to at least one particular neighbor network to the network management server 113 (get_one) (i.e. get_one).

Referring again to FIG. 2, in operation 214, the network management server 113 which received the request message for capability/configuration information (NH_Request_Option) illustrated in FIG. 3 from the MS 130 transmits a predetermined query to the NH database according to the request message for capability/configuration information (NH_Request_Option). When the MS 130 requests capability/configuration information (NH_Request_Option) with respect to all neighbor networks to the network management server 113, the query requests the capability/configuration information (NH_Request_Option) with respect to all neighbor networks around the MS 130 based on the request message for capability/configuration information (NH_Request_Option). When the MS 130 requests capability/configuration information (NH_Request_Option) with respect to at least one particular neighbor network from the network management server 113, the query requests the capability/configuration information with respect to a particular neighbor network around the MS 130 based on the request message for capability/configuration information (NH_Request_Option).

In operation 215, the NH database 120 extracts the capability/configuration information (NH_Request_Option) of the neighbor network by parsing a database field, and transmits the capability/configuration information as a reply to the network management server 113.

In operation 216, the network management server 113 transmits a capability/configuration information reply message (i.e. NH_Reply_Option) to the MS 130. In this instance, the capability/configuration information reply message includes the capability/configuration information (NH_Request_Option) of the neighbor network which is included in the query.

Figure 4:
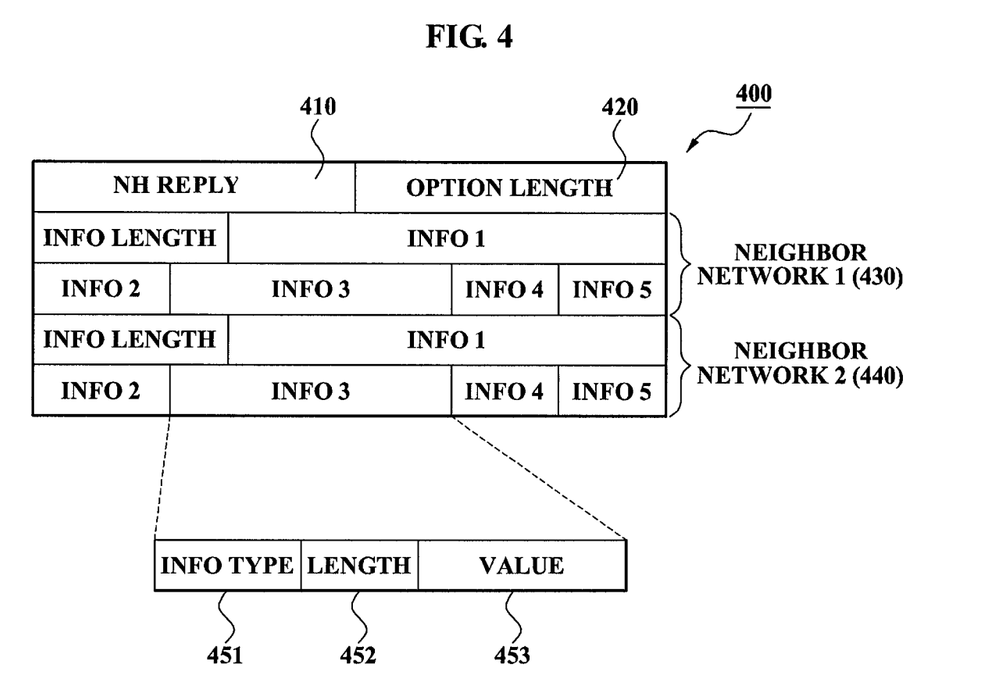
FIG. 4 is a diagram illustrating an example of a capability/configuration information reply message to transmit the capability/configuration information of the neighbor network from a network management server to a mobile station according to an embodiment of the present invention.

FIG. 4 is a diagram illustrating an example of a capability/configuration information reply message (NH_Reply_Option) to transmit the capability/configuration information of the neighbor network from a network management server to a MS according to an embodiment of the present invention.

The capability/configuration information reply message 400 illustrated in FIG. 4 includes a NH Reply 410 and an option length 420. The NH Reply 410 indicates a type of a DHCP reply. The option length 420 indicates a size of an option such as a byte. The NH Reply 410 and the option length 420 may follow a standard DHCP option format which is stated in a DHCP reference, which is same as FIG. 3. An information set with respect to a neighbor network 1 includes a length of information (info length) included in the information set 430. Also, the information set with respect to the neighbor network 1 430 includes information 1 (info 1) through information 5 (info5) which are information element with respect to the neighbor network 1. Also, an information set with respect to a neighbor network 2 includes a length of information (info length) included in the information set 440. Also, the information set 440 with respect to the neighbor network 2 includes information 1 (info 1) through information 5 (info5) which are information element with respect to the neighbor network 2. Referring to FIG. 4, a configuration with respect to information 3 (info 3) which is included in the information sets 430 and 440 is illustrated in detail. The information 3 includes a corresponding information element type 451, a corresponding information element length 452, and a corresponding information element value 453 fields.

FIG. 4 illustrates when a number of the target network included in the request message for capability/configuration information (NH_Request_Option) which was transmitted in operation 213 in FIG. 2 is two or when a number of the neighbor network recorded in the NH database 120 is two. When the number of the target network where the MS 130 requests the capability/configuration information is increased or the number of the neighbor network recorded in the NH database 120 is great, a number of the information sets 430 and 440 may be increased. Also, the information fields included in the information sets 430 and 440 include five information fields in FIG. 4. However, a number of the information field may vary.

Referring again to FIG. 2, in operation 216, the capability/configuration information reply message (NH_Reply_Option) illustrated in FIG. 4 is transmitted to the MS 130. Also, in operation 217, the MS 130 which received the capability/configuration information reply message (NH_Reply_Option) selects a suitable neighbor network based on information of the neighbor network which is included in the capability/configuration information reply message (NH_Reply_Option). In operation 218, the MS 130 performs an connection procedure such as a 3-way handshake with the access point or the base station of a target neighbor network. In operation 219, the MS 130 may access the corresponding neighbor network through the access procedure, and use a mobile communication service via the neighbor network. When an access to a new neighbor network in the MS 130 is desired and is located in a mobile environment, the method of discovering the neighbor network illustrated in FIG. 2 may be used in a handover process to be provided in a seamless service.

The method of discovering the neighbor network illustrated in FIG. 2 may be applied as follows:

1) In a Wibro fast handoff, in order to use an identical pairwise master key (PMK), the MS 130 should know whether a predetermined base station is controlled by a predetermined network access server (NAS). In this instance, the Wibro indicates one wireless Internet standard which is defined in IEEE 802.16. The MS 130 may obtain an NAS identification (ID) from the network management server 113 prior to the 3-way handshake with the target base station by the method of discovering the neighbor network according to the present invention.

2) Before the MS 130 completes a handover to a target WiFi network, the MS 130 may obtain the NAS ID of a corresponding target WiFi network from the network management server 113. Accordingly, the MS 130 may conduct a pre-authentication.

3) The MS 130 may discover the base stations which are connected with an IP subnet. In this instance, the IP subnet is identical to an IP subnet of the network where the MS 130 is currently located. When attached to any one of the base stations, the MS 130 may easily ascertain that a current IP configuration is valid.

4) Channel information of a target access point of the capability/configuration information of the neighbor network which is obtained by the method of discovering the neighbor network according to the present invention is learned. Accordingly, the MS 130 may reduce continuous radio scanning. Also, a battery performance of the MS 130 may be increased.

5) The MS 130 may learn (a target foreign agent (FA) or an access router (AR) in advance. Accordingly, the MS 130 may request a bi-casting before completes a handover to the target network. The bi-casting relates to a semi-soft handover that communicating a previous point of attachment (POA) and that a new POA is needed.

Also, in order to embody the method of discovering the neighbor network according to the present invention, the request message for capability/configuration information (NH_Request_Option) and the capability/configuration information reply message (NH_Reply_Option) may be transmitted and/or received by using a media independent handover function (MIHF) frame. The MIHF frame is discussed in IEEE 802.21 Working Group (WG). A frame format for a request/reply of the information element with respect to the neighbor network by using the MIHF frame will be described in detail with reference to FIG. 5.

Figure 5:
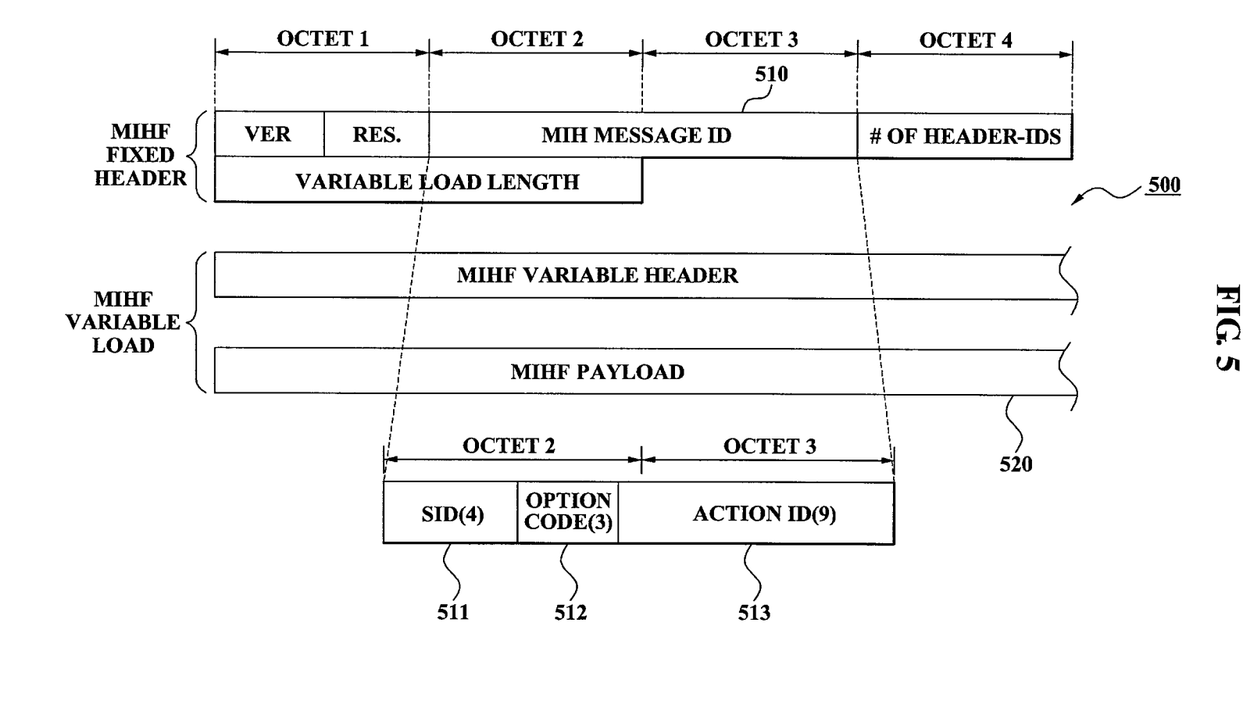
FIG. 5 is a diagram illustrating an example of an IEEE 802.21 frame format including a request message for capability/configuration information and a capability/configuration information reply message which are illustrated in FIGS. 3 and 4 according to an embodiment of the present invention.

FIG. 5 is a diagram illustrating an example of an IEEE 802.21 frame format including a request message for capability/configuration information and a capability/configuration information reply message which are illustrated in FIGS. 3 and 4 according to an embodiment of the present invention.

The IEEE 802.21 MIHF frame under discussion includes an MIHF fixed header of six bytes in total and an MIHF variable load having an undefined size. In this instance, the request message for capability/configuration information and the capability/configuration information reply message according to the present invention may be included in a media independent handover (MIH) message ID 510 field which occupies two bytes of the MIHF fixed header and a MIHF payload 520 of the MIHF variable load.

The MIH message ID 510 illustrated in FIG. 5 may include a four-bit service ID (SID) 511, a three-bit option code 512, and a nine-bit action ID 513. A service identifier which provides an information element of the neighbor network according to the present invention is inputted in the SID 511. Information about an NH Request 310 illustrated in FIG. 3 and an NH Reply 410 illustrated in FIG. 4 are inputted in the option code 512. Information corresponding to option lengths 320 and 420 in FIGS. 3 and 4 are inputted in the action ID 513. Also, when the IEEE 802.21 MIHF frame in FIG. 5 is the request message for capability/configuration information (NH_Request_Option), a MAC type 330 of a target network and a MAC address 340 of the target network illustrated in FIG. 3 may be included in the MIHF payload 520 of the MIHF variable load. Also, when the IEEE 802.21 MIHF frame in FIG. 5 is the capability/configuration information reply message (NH_Reply_Option), an information set of the neighbor network 1 or 2 430 or 440 illustrated in FIG. 4 may be included in the MIHF payload 520 of the MIHF variable Load.

As described above, in order to obtain the capability/configuration information of the neighbor network, the DHCP which is generally used in current IP networks is utilized. Also, the IEEE 802.21 MIHF frame including a request and reply of configuration information which are required by a standard DHCP are transmitted. Accordingly, the MS 130 in the All-IP environment may obtain the capability/configuration information of neighboring neighbor networks.

The method for discovering neighbor networks in the MS and a network system for enabling the method according to the above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic media such as magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, a handover of an MS in at least two different wireless network environments may be optimized.

Also, according to the present invention, a method for discovering neighbor networks in the MS which is easily applicable to a legacy network is provided by using a general DHCP.

Also, according to the present invention, information elements about neighbor networks may be provided to a MS by using a media independent handover (MIH) information service (IS) which is proposed by the IEEE 802.21 Working Group.

Also, according to the present invention, a specific solution and a transmission message format for a handover among different wireless networks under discussion in the IEEE 802.21 Working Group is provided.

The invention claimed is:

1. A network management server of a wireless network system, the server comprising:
   a neighborhood (NH) database configured to maintain capability/configuration information with respect to at least one neighbor network;
   a communication interface configured to receive a request message for the capability/configuration information of a neighbor network or all of neighbor networks from a mobile station, which is connected via a predetermined access point or a predetermined base station; and
   a database management unit configured to
      extract the capability/configuration information of the neighbor network, which is included in the request message, or of all of the neighbor networks, from the NH database, and
      control a reply message comprising the capability/configuration information to be transmitted to the mobile station via the communication interface, the capability/configuration information comprising a network access server (NAS) identification (ID) of an access point or a base station of the neighbor network, wherein the mobile station receives beacon information comprising a media access control (MAC) address of the access point or the base station of the neighbor network, and the request message
includes the MAC address when the reply message is to comprise the capability/configuration information of the neighbor network, and
does not include the MAC address when the reply message is to comprise the capability/configuration information of all of the neighbor networks.

2. The server of claim 1, wherein the network management server comprises a dynamic host configuration protocol (DHCP) server.

3. The server of claim 1, wherein the request message comprises a service identifier and an option length.

4. The server of claim 1, wherein:
the reply message comprises a service identifier and an option length; and
the reply message further comprises
the capability/configuration information of the neighbor network, when the MAC address of the neighbor network is included in the request message, and
the capability/configuration information of all of the at least one neighbor network, which are recorded in the NH database, when the MAC address information of the neighbor network is not included in the request message.

5. The server of claim 1, wherein:
the request message is in a format of a media independent handover function (MIHF) frame; and
the request message comprises
a media independent handover (MIH) identifier field comprising a service identifier and an option length, and
a MIHF payload field selectively comprising the MAC address of the neighbor network.

6. The server of claim 1, wherein:
the reply message is in a format of a media independent handover function (MIHF) frame; and
the reply message comprises
a media independent handover (MIH) identifier field comprising a service identifier and an option length, and
a MIHF payload field comprising the capability/configuration information of the neighbor network.

7. The server of claim 6, wherein the capability/configuration information of the neighbor network that is included in the MIHF payload field comprises the capability/configuration information with respect to all of the at least one neighbor network, which are recorded in the NH database, or the neighbor network included in the request message.

8. The server of claim 1, wherein the network management server is located in each wireless network of the wireless network system.

9. The server of claim 1, wherein the capability/configuration information is associated with the access point or the base station of the neighbor network, and further comprises the MAC address, or an operator identifier, or an internet protocol (IP) identifier information, or a network type, or a radio type, or a roaming partner list, or security, or quality of service (QoS) level information of each network, or current load information for each neighbor network, or a geographical location, or a pre-authentication function, or a pricing plan, or a location based service (LBS) list, or information of supporting a virtual private network (VPN), or a physical layer type, or a channel parameter, or any combination thereof.

10. The server of claim 1, wherein the wireless network system comprises an all internet protocol (ALL-IP).

11. A method of discovering and connecting to a neighbor network for a mobile station, the method comprising:
receiving beacon information from the neighbor network;
identifying the neighbor network by using the beacon information;
transmitting a request message for capability/configuration information of the neighbor network or all of neighbor networks to a network management server via a predetermined access point or a predetermined base station;
receiving a reply message comprising the capability/configuration information with respect to the neighbor network or all of the neighbor networks from the network management server, the capability/configuration information comprising a network access server (NAS) identification (ID) of an access point or a base station of the neighbor network; and
establishing a three-way handshake with the neighbor network based on the received capability/configuration information to provide a substantially seamless transition in service for the mobile station,
wherein the beacon information comprises a media access control (MAC) address of the access point or the base station of the neighbor network, and the request message
includes the MAC address when the reply message is to comprise the capability/configuration information of the neighbor network, and
does not include the MAC address when the reply message is to comprise the capability/configuration information of all of the neighbor networks.

12. The method of claim 11, wherein the network management server comprises a dynamic host configuration protocol (DHCP) server.

13. The method of claim 11, wherein the request message comprises a service identifier and an option length.

14. The method of claim 11, wherein:
the reply message comprises a service identifier and an option length; and
the reply message further comprises
the capability/configuration information of the neighbor network, when the MAC address of the neighbor network is included in the request message, and
the capability/configuration information of all of the neighbor networks, which are recorded in a neighborhood (NH) database, when the MAC address of the neighbor network is not included in the request message.

15. The method of claim 11, wherein:
the request message is in a format of a media independent handover function (MIHF) frame; and
the request message comprises
a media independent handover (MIH) identifier field comprising a service identifier and an option length, and
a MIHF payload field selectively comprising the MAC address of the neighbor network.

16. The method of claim 11, wherein:
the reply message has a media independent handover function (MIHF) frame format; and
the reply message comprises
a media independent handover (MIH) identifier field comprising a service identifier and an option length, and
a MIHF payload field comprising the capability/configuration information of the neighbor network.

17. The method of claim 16, wherein the capability/configuration information of the neighbor network that is included in the MIHF payload field comprises the capability/configuration information with respect to all of the neighbor networks, which are recorded in a neighborhood (NH) database, or the neighbor network, which is included in the request message.

18. The method of claim 11, wherein the network management server is installed for each wireless network of a wireless network system.

19. The method of claim 11, wherein the capability/configuration information is associated with the access point or the base station of the neighbor network, and further comprises the MAC address, or an operator identifier, or an internet protocol (IP) identifier information, or a network type, or a radio type, or a roaming partner list, or security, or quality of service (QoS) level information of each network, or current load information for each neighbor network, or a geographical location, or a pre-authentication function, or a pricing plan, or a location based service (LBS) list, or information of supporting a virtual private network (VPN), or a physical layer type, or a channel parameter, or any combination thereof.

20. The method of claim 11, further comprising:
analyzing the capability/configuration information of the neighbor network, which is included in the reply message;
selecting the neighbor network to be connected to based on a result of the analysis; and
connecting to the selected neighbor network.

21. A non-transitory computer-readable recording medium storing a program for implementing a neighbor network discovery and connection method for a mobile station comprising:
receiving beacon information from the neighbor network;
identifying the neighbor network by using the beacon information;
transmitting a request message for capability/configuration information of the neighbor network or all of neighbor networks to a network management server via a predetermined access point or a predetermined base station;
receiving a reply message comprising the capability/configuration information with respect to the neighbor network or all of the neighbor networks from the network management server, the capability/configuration information comprising a network access server (NAS) identification (ID) of an access point or a base station of the neighbor network; and
establishing a three-way handshake with the neighbor network based on the received capability/configuration information to provide a substantially seamless transition in service for the mobile station,
wherein the beacon information comprises a media access control (MAC) address of the access point or the base station of the neighbor network, and the request message
includes the MAC address when the reply message is to comprise the capability/configuration information of the neighbor network, and
does not include the MAC address when the reply message is to comprise the capability/configuration information of all of the neighbor networks.

22. A method of providing neighbor network information, the method comprising:
maintaining a neighborhood (NH) database recording capability/configuration information with respect to at least one neighbor network, which is located around a network management server;
receiving a request message for the capability/configuration information of a neighbor network or all of neighbor networks from a mobile station, which is connected via a predetermined access point or a predetermined base station;
extracting the capability/configuration information of the neighbor network, which is included in the request message, or of all of the neighbor networks, from the NH database; and
transmitting a reply message comprising the capability/configuration information to the mobile station, the capability/configuration information comprising a network access server (NAS) identification (ID) of an access point or a base station of the neighbor network,
wherein the mobile station receives beacon information comprising a media access control (MAC) address of the access point or the base station of the neighbor network, and the request message
includes the MAC address when the reply message is to comprise the capability/configuration information of the neighbor network, and,
does not include the MAC address when the reply message is to comprise the capability/configuration information of all of the neighbor networks.

23. The method of claim 22, wherein the network management server is a dynamic host configuration protocol (DHCP) server.

24. A non-transitory computer-readable recording medium storing a program for implementing a method of providing neighbor network information, the method comprising:
maintaining a neighborhood (NH) database recording capability/configuration information with respect to at least one neighbor network, which is located around a network management server;
receiving a request message for the capability/configuration information of a neighbor network or all of neighbor networks from a mobile station, which is connected via a predetermined access point or a predetermined base station;
extracting the capability/configuration information of the neighbor network, which is included in the request message, or of all of the neighbor networks, from the NH database; and
transmitting a reply message comprising the capability/configuration information to the mobile station, the capability/configuration information comprising a network access server (NAS) identification (ID) of an access point or a base station of the neighbor network,
wherein the mobile station receives beacon information comprising a media access control (MAC) address of the access point or the base station of the neighbor network, and request message
includes the MAC address when the reply message is to comprise the capability/configuration information of the neighbor network, and
does not include the MAC address when the reply message is to comprise the capability/configuration information of all of the neighbor networks.

25. The server of claim 1, wherein the capability/configuration information is associated with the access point or the base station of the neighbor network.

26. The server of claim 1, wherein the capability/configuration information is associated with the access point or the base station of the neighbor network, and further comprises a roaming partner list, current load information for each neighbor network, a pre-authentication function, a pricing plan, a location based service (LBS) list, and information of supporting a virtual private network (VPN).

27. The server of claim 1, wherein the capability/configuration information is associated with the access point or the base station of the neighbor network, and further comprises the MAC address, an operator identifier, an internet protocol (IP) identifier information, a network type, a radio type, a roaming partner list, quality of service (QoS) level information of each network, current load information for each neighbor network, a geographical location, a pre-authentication function, a pricing plan, a location based service (LBS) list, information of supporting a virtual private network (VPN), a physical layer type, and a channel parameter.

28. The server of claim 1, wherein the request message further selectively comprises MAC type information of the neighbor network, the MAC type information comprising a size and a format of the MAC address of the neighbor network.

* * * * *